US006655721B2

(12) United States Patent
Hagen

(10) Patent No.: US 6,655,721 B2
(45) Date of Patent: Dec. 2, 2003

(54) FRONT END FOR A MOTOR VEHICLE

(75) Inventor: Stefan Hagen, Weyhausen (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/126,370

(22) Filed: Apr. 19, 2002

(65) Prior Publication Data

US 2002/0163211 A1 Nov. 7, 2002

(30) Foreign Application Priority Data

May 2, 2001 (DE) .................................. 101 21 354

(51) Int. Cl.$^7$ ................................................ B60R 19/34
(52) U.S. Cl. ....................................................... 293/133
(58) Field of Search ................................ 293/102, 132, 293/133, 155; 296/189

(56) References Cited

U.S. PATENT DOCUMENTS 3,893,726 A * 7/1975 Strohschein ............ 293/133 X
4,778,208 A * 10/1988 Lehr et al. ............... 296/189 X
6,059,331 A * 5/2000 Mori ........................... 293/133
6,176,530 B1 * 1/2001 Gollungberg ............... 293/133

FOREIGN PATENT DOCUMENTS

DE 2458278 * 6/1976 ................. 293/102
DE 30 26 749 A1 2/1982
EP 0 235 635 B1 9/1987

* cited by examiner

Primary Examiner—Dennis H. Pedder
(74) Attorney, Agent, or Firm—Laurence A. Greenberg; Werner H. Stemer; Manfred Beck

(57) ABSTRACT

A front end for a motor vehicle includes a bumper configuration and is configured to absorb impact energy in the event of an impact by another motor vehicle. The front end has lateral longitudinal members having longitudinal-member heads which are in each case connected to bumper supports. At least one of the lateral longitudinal members is provided with at least one absorbing device for absorbing impact energy outside a longitudinal-member plane. The absorbing device has an active device for indirectly transmitting at least some of the impact energy to a longitudinal side of an associated one of the lateral longitudinal members.

18 Claims, 2 Drawing Sheets

FRONT END FOR A MOTOR VEHICLE

BACKGROUND OF THE INVENTION

Field of the Invention

The invention relates to a front end for a motor vehicle having a bumper configuration which has a bumper support and is intended for absorbing impact energy in the event of an impact by another motor vehicle.

Different types of motor vehicles generally have bumper configurations that are disposed at different heights. In the case of accidents in which the front region of a motor vehicle penetrates into another vehicle during the accident, there is often times the effect that, because of the respective support structures of the two motor vehicles, a possible deformation capacity is not used completely and an associated conversion of impact energy does not take place in the components provided for this purpose. As a result, the passenger cell is subjected to a considerable extent to impact energy, so that, when producing the motor vehicle, the passenger compartment has to be configured for relatively large loads in the event of a crash, which requires a corresponding additional outlay.

In order to protect the passenger compartment, European Patent No. EP 0 235 635 B1 proposes a passenger-vehicle chassis which is of a cellular or modular construction. In the case of this chassis, the longitudinal members of the auxiliary frame, that are connected to the front wall for the dimensionally rigid central cell, are provided with predetermined desired bending points. In this case, the predetermined bending points are provided on the longitudinal members in such a manner that after a certain path of deformation of the front end has been exhausted, the deformation of the auxiliary frame along the desired bending points allows to include the drive unit into the deformation, and thus to increase the deformation capacity.

A disadvantage of this configuration is that in the case of an impact of motor vehicles having longitudinal-member planes at respective different heights, the deformation of the components provided for this purpose, for example the longitudinal members and the auxiliary frame, only takes place when the drive unit has been subjected to impact energy. The impact energy is then transmitted to the support structure exclusively via the fastening devices of the drive unit.

Published, Non-Prosecuted German Patent Application No. DE 30 26 749 A1 therefore proposes to provide at least one supporting element on the front end, which element has a stop surface and is assigned to a longitudinal member. The effect achieved thereby is that the impact energy is directed to the components provided for the deformation.

However, a disadvantage of this configuration is that the stop surface is effective exclusively in the vicinity of the longitudinal member and that it has to be ensured that the deformation energy is transmitted during the entire deformation process.

A further disadvantage is that the longitudinal-member plane remains essentially unchanged during the deformation process, and thus in the case of large impact energies, the supporting element can be torn off or deformed and the stop surface can be pushed over or under the longitudinal-member plane of the other party involved in the accident and therefore remains essentially ineffective.

In all of the above-described conventional structures it is disadvantageous that desired predetermined bending points must already be made at the designated points during the production of the motor vehicle. As a result, the rigidity of the components provided with the desired predetermined bending points is reduced and the entire support structure therefore has a reduced rigidity.

SUMMARY OF THE INVENTION

It is accordingly an object of the invention to provide a front end configuration for a motor vehicle which overcomes the above-mentioned disadvantages of the heretofore-known front end configurations of this general type and which in particular ensures that the impact energy of the vehicles involved in an accident is absorbed at an early point by the components provided for the deformation, even in the case of motor vehicles having structurally incompatible chassis.

With the foregoing and other objects in view there is provided, in accordance with the invention, a front end configuration for a motor vehicle, including:

a bumper configuration configured to absorb an impact energy in case of a vehicle impact, the bumper configuration including bumper supports;

lateral longitudinal members having respective longitudinal-member heads connected to respective ones of the bumper supports, the lateral longitudinal members defining a longitudinal-member plane; and an absorbing device assigned to a given one of the lateral longitudinal members, the absorbing device being configured to absorb at least part of the impact energy outside the longitudinal-member plane, the absorbing device having an active device configured to indirectly transmit at least part of the impact energy to a longitudinal side of the given one of the longitudinal members.

In other words, the object of the invention is achieved in that at least one longitudinal member is assigned at least one absorbing device for absorbing impact energy outside the longitudinal-member plane, and in that the absorbing device is provided with an active device for indirectly transmitting at least some of the impact energy to a longitudinal side of the associated longitudinal member. In this case, it is advantageous for the impact energy to be transmitted in the form of thrust energy via the active device to the longitudinal side of the associated longitudinal member. The thrust energy is converted there into deformation energy. The longitudinal member is therefore pre-damaged at the thrust point of the active device, so that it bends at this point. A further advantageous effect is that the axial rigidity of the longitudinal member can be reduced in this case and therefore differences in the rigidities of the front ends of the motor vehicles involved in the accident can be compensated for without having to reduce the rigidity of the longitudinal member during production with predetermined desired bending points. The effect achieved by the bending of the longitudinal member is that the longitudinal-member planes of the motor vehicles involved in the accident change.

It has been shown that the longitudinal members collapse in each case because of the pre-damage which has been caused. During the bending collapse caused in this manner impact energy is converted into deformation energy on both sides of the parties involved in the accident. It has also turned out that the configuration according to the invention has a favorable effect on the structural behavior of the longitudinal members by dispersing or dissipating the absorbed energy during the bending collapse. The great rigidity of the longitudinal members means that the deformation modes of the folding and buckling remain unaffected during a frontal impact with a rigid obstacle, since in this case the active device is displaced parallel together with the folding unit in the direction of the center line of the longitudinal members because the absorbing device is not deformed. This is assisted particularly by the fact that desired predetermined bending points for changing the longitudinal-member plane during the crash can be omitted.

Moreover, in the case of relatively large vehicles, the rigidity of the front end is reduced by the pre-damage or preliminary damage to the longitudinal-member head, which, in the case of collisions of two vehicles having respective different rigidities of the chassis, results in a more favorable deformation behavior for the weaker party in the accident. On the other hand, in the case of accidents not involving other parties, the undiminished energy-absorbing capacity is available during the folding and buckling process as a result of the manufactured rigidity.

The configuration according to the invention can moreover be realized in an advantageous manner by using a simple structural construction.

According to another feature of the invention, the absorbing device is connected to the longitudinal-member head of the associated longitudinal member and/or is fastened to the longitudinal member downstream of the longitudinal-member head. It is therefore possible, depending on the configuration of the front-end structure, to provide the absorbing device in front of the longitudinal member, more specifically on the longitudinal-member head. This achieves the effect that the preliminary damage is already produced early during the impact and the longitudinal member is therefore deformed.

According to a further feature of the invention, if required, the absorbing device may be provided on the longitudinal member such that the absorbing device is disposed downstream of the longitudinal-member head.

According to another feature of the invention, the active device is provided above and/or below the longitudinal-member plane of the front end. Depending on the structurally intended height of the longitudinal-member plane, it is therefore possible to achieve the effect according to the invention in the case of other parties in the accident which have longitudinal-member planes which are situated above or below one's own longitudinal-member plane.

According to an advantageous feature of the invention, the absorbing device has an essentially plate-like configuration. It is therefore ensured that the active device acts in the designated manner on the longitudinal side of the associated longitudinal member, since the absorbing device buckles or bends in a predetermined manner and guides the active device onto the thrust point provided therefor on the longitudinal side of the longitudinal member. For this purpose, provision is also made for the absorbing device to be provided essentially perpendicular with respect to the longitudinal direction of the associated longitudinal member.

The configuration can be produced in a simple manner by preferably connecting the active device integrally to the absorbing device, i.e. the active device and the absorbing device form a one-piece element. In this case, it has proven advantageous for the active device to be provided in a flexurally rigid manner and at an angle of penetration with respect to the longitudinal side of the longitudinal member and, when the absorbing device is subjected to impact energy, to penetrate into the longitudinal member. At the same time, it is preferable for the active device to be dimensionally stable when penetrating, i.e. it essentially retains its form. The angle of penetration is preferably in the range of 10° to 90° and even more preferably between 20° and 70°.

According to a preferred feature of the invention, the active device is disposed at a predetermined distance from the longitudinal side of the longitudinal member. It is thereby avoided that accidents with little impact energy cause a deformation of the longitudinal members and thus it is avoided that even modest impacts cause a great deal of damage to the motor vehicle.

According to a further feature of the invention, the active device is formed as a plate-shaped configuration. It is thus advantageously achieved that even lateral actions on the absorbing device have the result that the active device acts on a longitudinal side of the associated longitudinal member. Of course, according to the invention, the active device can be configured as a brace or a strut or in some other form which produces the effect according to the invention in the event of a crash.

An advantage of the device according to the invention is that the compatibility of different front-end geometries can be improved and that a difference in front-end rigidity can be compensated for in case respective other parties in the accident differ with respect to their front-end rigidity.

With the objects of the invention in view there is also provided, a front end configuration for a motor vehicle, including:

a bumper support configuration;

lateral longitudinal members having respective longitudinal-member heads connected to the bumper support configuration, the lateral longitudinal members defining a longitudinal-member plane;

an absorbing device assigned to a given one of the lateral longitudinal members, the absorbing device being configured to absorb impact energy outside the longitudinal-member plane in case of a vehicle impact; and the given one of the lateral longitudinal members having a longitudinal side, the absorbing device having an active device configured to transmit at least part of the impact energy to the longitudinal side of the given one of the lateral longitudinal members.

Other features which are considered as characteristic for the invention are set forth in the appended claims.

Although the invention is illustrated and described herein as embodied in a front end for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
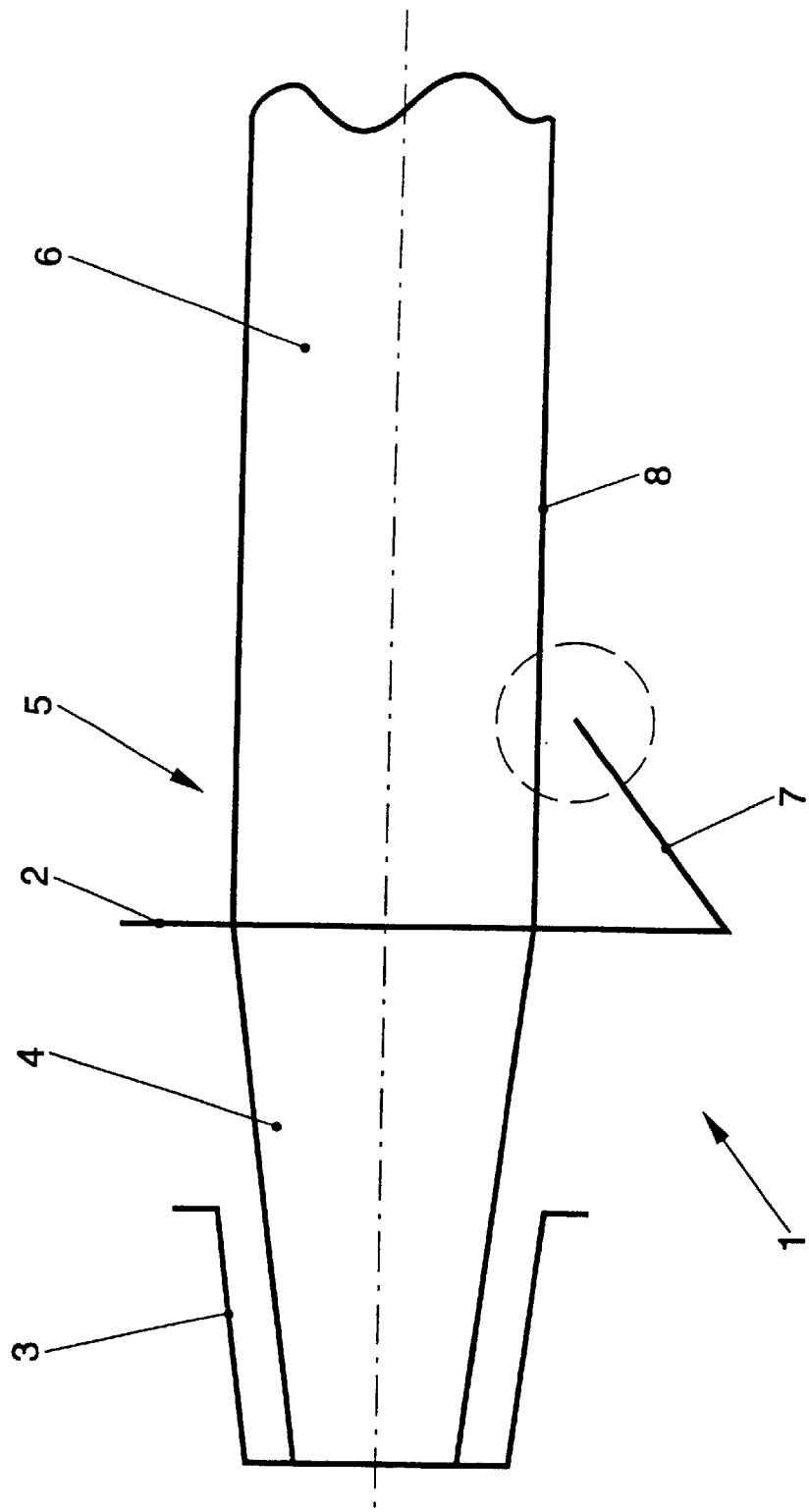
FIG. 1 is a partial, diagrammatic sectional view of a bumper configuration with a longitudinal member and an absorbing configuration according to the invention in the non-deformed state.

Referring now to the figures of the drawings in detail and first, particularly, to FIG. 1 thereof, there is shown a bumper configuration 1 having an absorbing device or take-up device 2 and a bumper transverse member 3 in the non-deformed state. The crash box 4 is provided between the absorbing device 2 and the bumper transverse member or bumper cross member 3. The absorbing device 2 is connected at the longitudinal-member head 5 to the longitudinal member or longitudinal rail 6 and has an active device 7 which is configured as a flexurally rigid hook. As can be seen in the figures, the active device 7 is disposed at an angle with respect to the bottom side 8 of the longitudinal member 6. Of course, the invention also covers configurations in which the active device 7 is provided at an angle with respect to another side 8 of the longitudinal member 6, and also configurations having a plurality of absorbing devices 2 with respective active devices 7 which are in each case directed toward a respective longitudinal-member side 8.

In the non-deformed state, the tip of the active device 7 is disposed at a given distance from the longitudinal-member side 8 of the longitudinal member 6. This spacing distance ensures that in the case of an impact of two motor vehicles having an essentially compatible geometry of the respective members, damage to the longitudinal member 6 during the deformation thereof in the longitudinal-member plane is avoided. The longitudinal-member plane extends perpendicular with respect to the plane of projection in the drawing.

In the case of an impact by another motor vehicle having essentially the same member geometry with regard to the height of the longitudinal-member plane, the absorbing device 2 and the active device 7 are displaced mainly parallel to the longitudinal-member plane, and the longitudinal members 6, 6' are deformed in the designated manner, in which case the impact energy is converted into deformation energy.

Figure 2:
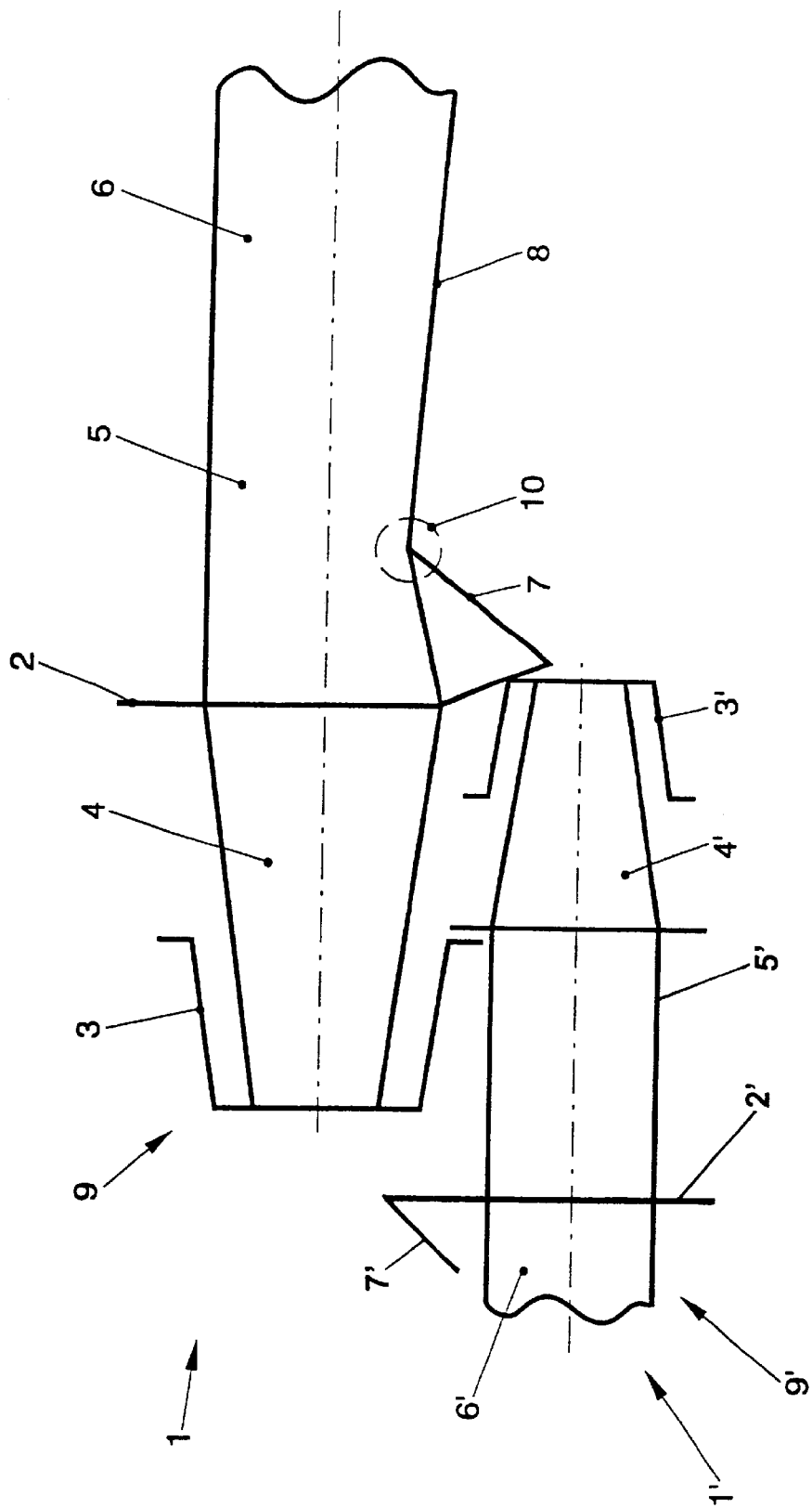
FIG. 2 is a partial, diagrammatic sectional view of bumper configurations with longitudinal members of two parties in an accident, one motor vehicle having an absorbing configuration according to the invention in a deformed state.

FIG. 2 illustrates an accident situation with two motor vehicles 9, 9', the bumper configurations 1, 1' of the parties in the accident having longitudinal members 6, 6' and having respective different member geometries with regard to the height of the longitudinal-member planes. This is illustrated in the drawing by different heights of the longitudinal members 6, 6'. In this case, the motor vehicle 9 has the absorbing configuration 2 with the active device 7 according to the invention, which is shown in the deformed state. During the impact, the longitudinal member 6' of the other motor vehicle 9' has been pushed under the longitudinal member 6 of the motor vehicle 9 provided with the absorbing configuration 2 according to the invention. The absorbing device 2 with the active device 7 has been deformed by the bumper transverse member 3' of the other party in the accident such that the active device 7 has penetrated into the longitudinal side 8 of the longitudinal member 6 and has produced a preliminary damage indicated by reference numeral 10.

As the deformation continues further and further impact energy acts on the longitudinal member 6 having the absorbing device 2, the longitudinal member 6 will buckle at the point of the preliminary damage 10 and will consequently collapse. In the process, the longitudinal-member head 5 and the crash box 4 are lowered together with the bumper transverse member 3 in the direction toward the longitudinal member 6' of the other party in the accident. In the most favorable case, the longitudinal-member heads 5, 5' become wedged in one another during the impact, with the result that they coil up in one another during the further course of the deformation.

During the further course of the deformation the forces act directly on the longitudinal members 6, 6' provided for the deformation, in which case the differences with regard to the heights of the longitudinal-member planes are compensated for.

FIG. 2 further illustrates that the front end of the motor vehicle 9' may optionally be equipped with an absorbing device 2' that is disposed downstream of the longitudinal member head 5'. The active device 7' of the absorbing device 2' is in this case disposed above the longitudinal-member plane of the longitudinal member 6'.

I claim:

1. A front end configuration for a motor vehicle, comprising:

a bumper configuration configured to absorb an impact energy in case of a vehicle impact, said bumper configuration including bumper supports;

lateral longitudinal members having respective longitudinal-member heads connected to respective ones of said bumper supports, said lateral longitudinal members defining a longitudinal-member plane; and an absorbing device assigned to a given one of said lateral longitudinal members, said absorbing device being configured to absorb at least part of the impact energy outside the longitudinal-member plane, said absorbing device having an active device configured to transmit at least part of the impact energy to a longitudinal side of said given one of said lateral longitudinal members such that said given one of said lateral longitudinal members collapses, said active device being disposed at a given spacing distance from said longitudinal side of said given one of said lateral longitudinal members.

2. The front end configuration according to claim 1, wherein said absorbing device is fastened to a given one of said longitudinal-member heads associated with said given one of said lateral longitudinal members.

3. The front end configuration according to claim 1, wherein said absorbing device is disposed downstream of a given one of said longitudinal-member heads associated with said given one of said lateral longitudinal members and is fastened to said given one of said lateral longitudinal members.

4. The front end configuration according to claim 1, wherein said active device is disposed above the longitudinal-member plane.

5. The front end configuration according to claim 1, wherein said active device is disposed below the longitudinal-member plane.

6. The front end configuration according to claim 1, wherein said absorbing device is a substantially plate-shaped device with an angular projection as said active device.

7. The front end configuration according to claim 1, wherein said given one of said lateral longitudinal members defines a longitudinal direction, and said absorbing device is disposed substantially perpendicular with respect to the longitudinal direction.

8. The front end configuration according to claim 1, wherein said active device is integrally connected to said absorbing device.

9. The front end configuration according to claim 1, wherein said active device is a flexurally rigid device disposed at a given penetration angle with respect to said longitudinal side of said given one of said lateral longitudinal members such that said active device causes said given one of said lateral longitudinal members to collapse when said absorbing device is subjected to the impact energy.

10. The front end configuration according to claim 1, wherein said active device is a dimensionally stable device disposed at a given penetration angle with respect to said longitudinal side of said given one of said lateral longitudinal members such that said active device causes said given one of said lateral longitudinal members to collapse when said absorbing device is subjected to the impact energy.

11. The front end configuration according to claim 1, wherein said active device is a substantially plate-shaped device.

12. A front end configuration for a motor vehicle, comprising:

a bumper support configuration;

lateral longitudinal members having respective longitudinal-member heads connected to said bumper support configuration, said lateral longitudinal members defining a longitudinal-member plane;

an absorbing device assigned to a given one of said lateral longitudinal members, said absorbing device being configured to absorb impact energy outside the longitudinal-member plane in case of a vehicle impact; and said given one of said lateral longitudinal members having a longitudinal side, said absorbing device having an active device configured to transmit at least part of the impact energy to said longitudinal side of said given one of said lateral longitudinal members such that said given one of said lateral longitudinal members collapses, said active device being disposed at a given spacing distance from said longitudinal side of said given one of said lateral longitudinal members.

13. The front end configuration according to claim 12, wherein said absorbing device is fastened to a given one of said longitudinal-member heads associated with said given one of said lateral longitudinal members.

14. The front end configuration according to claim 12, wherein said absorbing device is fastened to said given one of said lateral longitudinal members.

15. The front end configuration according to claim 12, wherein said absorbing device is a substantially plate-shaped device.

16. The front end configuration according to claim 12, wherein said given one of said lateral longitudinal members defines a longitudinal direction, and said absorbing device extends substantially perpendicularly to the longitudinal direction.

17. The front end configuration according to claim 12, wherein said active device defines a given penetration angle with respect to said longitudinal side of said given one of said lateral longitudinal members such that said active device causes said given one of said lateral longitudinal members to collapse when said absorbing device is subjected to the impact energy.

18. The front end configuration according to claim 12, wherein said active device is a substantially plate-shaped device.

* * * * *